United States Patent [19]

Jones et al.

[11] 4,158,656

[45] Jun. 19, 1979

[54] OILSEED PROCESSING

[75] Inventors: John D. Jones; John Holme, both of Ottawa, Canada

[73] Assignee: Canadian Patents and Development Limited, Ottawa, Canada

[21] Appl. No.: 881,490

[22] Filed: Feb. 27, 1978

[51] Int. Cl.$^2$ ................................................. A23J 1/14
[52] U.S. Cl. ................................. 260/123.5; 426/656
[58] Field of Search ...................................... 260/123.5

[56] References Cited

U.S. PATENT DOCUMENTS

| | | | |
|---|---|---|---|
| 3,099,649 | 7/1963 | Kawamura et al. | 260/123.5 |
| 3,392,026 | 7/1968 | Musbakas et al. | 260/123.5 X |
| 3,560,217 | 2/1971 | Youngs et al. | 260/123.5 X |
| 3,758,452 | 9/1973 | Owen | 260/123.5 |
| 3,828,017 | 8/1974 | Finley et al. | 260/123.5 X |
| 3,966,982 | 6/1976 | Becker | 260/123.5 X |

FOREIGN PATENT DOCUMENTS 891437 1/1972 Canada.
999186 11/1976 Canada.

*Primary Examiner*—Walter C. Danison
*Attorney, Agent, or Firm*—Richard J. Hicks; Stanley E. Johnson

[57] ABSTRACT

A process for producing a detoxified protein concentrate product from defatted oilseeds, particularly those of the thioglucoside and phenolic containing types such as rapeseed, mustard or Crambe, in which dehulled, defatted seeds are extracted with an aqueous alcohol solvent under substantially non-oxidizing conditions, so as to prevent oxidation of the contained phenolic compounds and inhibit enzymic degradation of the glucosinolates. The solid residue of the extraction is dried at a temperature below about 60° C.

11 Claims, 2 Drawing Figures

OILSEED PROCESSING

This invention relates to the treatment of thioglucoside-containing oilseeds, such as those of the rapeseed, mustard and Crambe types, and which may also contain phenol-like compounds.

As is well known, certain oilseeds, such as rapeseed (Genus Brassica) which is one of the five most widely produced oilseeds in the world, contain thioglucosides (glucosinolates) which, by means of endogenic enzymes, e.g. myrosinases, are split into the deleterious substances isothiocyanates and/or oxazolidinethiones, and glucose and bisulphate. Other objectionable substances present in the seed, from the point of view of their use as animal or human feeds, include phenolics such as tannins, and sinapine, all of which have negative sensory and nutritional effects. It is also known that thioglucosides can be removed from crushed oilseed by aqueous extraction (Canadian Pat. No. 999,186 issued Feb. 11, 1976 to Anjou et al and Canadian Pat. No. 891,437 issued Jan. 25, 1972 to Tape et al) following a myrosinase inactivating water treatment which is usually accomplished by soaking the seeds in hot water at 185° F. or more for several minutes to half an hour or more. The hot water treatment also has the advantage that it assists in the loosening of the seed coat. Following deactivation, aqueous extraction, crushing and drying, the seeds are flaked, air classified into two fractions —a hull fraction containing some pulverized seed meat material and a seed meat fraction — and the oil is extracted from the seed meat fraction by pressing and solvent extraction, yielding an oil and a protein-rich white bland non-toxic defatted flour suitable for human or animal consumption.

The prior art processes are, however, not without their disadvantages. Firstly, the cooking or hot water heat treatment over a period of time, although deactivating the myrosinase, is sufficient to cause some enzymic degradation of glucosinolates to form isothiocyanates or other degradation products some of which are fat soluble and subsequently extracted with the oil to yield sulphur-containing oils while the remainder reside in the meal. Secondly, the moisture present is sufficient to permit some solubilization of gums, mucilages and phospholipids in the oil-extraction solvent, thus extracting these substances into the oil. Thirdly, chlorophyll exists in the seed as a chlorophyll-protein complex and as such is not soluble in hexane. However, heat treatment of the seed during the cooking process leads to hydrolysis of this complex and the release of chlorophyll which is soluble in the oil-extraction solvent. The chlorophyll is also partly degraded by heat to chlorophyllides and related compounds also soluble in the oil and solvent. Thus, the quality of crude rapeseed oil available for alkali and physical refining is not as high as is desired and the purification and refining thereof is more difficult. Fourthly, high temperature treatment in the presence of water denatures the protein thereby rendering it of low solubility. Rapeseed oil processing is not, therefore, as commercially attractive as the processing of other available vegetable oils such as soya, peanut and sunflower oils, with which it must compete in the market place. Rapeseed is, however, an attractive crop in areas of the world, including the Canadian Prairie provinces, which do not have a sufficiently benign climate to support soybeam or other oilseed culture, and efforts are necessary to improve the processing thereof.

Although some success has been achieved in the development of rapeseed varieties with much reduced glucosinolate content, from which the sulphur originates, little can be done, in existing plants, to reduce solubilization of gums, mucilages and phospholipids in hexane in the presence of moisture. Marked reduction of chlorophyll in extracted rapeseed oil can be achieved by crushing well ripened rapeseed in which there is very little or no chlorophyll. However, this is very difficult in countries, such as Canada, where the growing season for rapeseed is short and the complete ripening of seed is infrequently achieved due to premature frost, cool temperatures of early dehydration of the seed before the chlorophyll has disappeared from the seed.

It has also been found that commercial rapeseed meal has a high fibre content, derived from the high proportion of seed coat present in the seed, which may amount to as much as one third by weight of the oil extracted seed. The resultant meal has a relatively low energy content and thus has only limited value as a protein and energy source in feed for poultry and pigs. If the seed coat (hull) is removed from the seed, a light coloured, clean, defatted meal having a protein content of at least 50% and a fibre content of 5% or less cann be achieved, which is a highly desirable feed component of high nutritive value for poultry and pigs. Heretofore there has been no commercially acceptable method to separate the seed coat from the meal.

We have found that, rather than proceeding by way of the conventional hot water deactivation treatment, followed by flaking, solvent extraction of a low grade oil and milling of a high fibre content meal, superior products are obtained by cracking clean seed following an optional but preferred predrying step, dehulling to remove the hulls and pulverized fine meat, and drying the dehulled oil-containing seed fraction at a temperature below about 75° C. to a moisture content in the range 1–3%, preferably in a fluidized bed dryer. After drying the dried cracked seed meats are flaked and subjected to solvent extraction using any suitable and conventional organic solvent, such as hexane or other solvent acceptable for food product use, to remove the oil and leave a substantially defatted proteinaceous meal-product which still remains substantially all the toxic and other objectionable constituents. The problem remains, therefore, of the treatment of the defatted meal to produce a protein concentrate which contains (a) no detectable residual glucosinolate or degradation product thereof, (b) no detectable residual phenolics, as shown by absence of dark coloration on suspension of the product in alkali solution, (c) no detectable residual yellow pigmentation, which is intensified on suspension of the product in alkali solution, (d) a nitrogen solubility of 25–30% in water, and 50% in dilute alkali at pH 10.0 and (e) a bland flavour and white to slightly off-white colour. Such a protein concentrate product would have important uses as a protein food ingredient usable in the manufacture of meat extenders, beverages, bakery and pasta products and other fabricated foods such as simulated meats.

We have found that the desired product can be produced by selectively removing the glucosinolates, phenolics, and yellow pigmentation by solubilization in aqueous alcohol solutions whilst retaining the protein in an insoluble state, and under conditions whereby the oxidation of phenolics is avoided during the processing, the water solubility of the protein retained and whereby enzyme activity is inhibited so that the glucosinolates are retained intact. The soluble and insoluble phases are separated and the protein concentrate is recovered.

Defatted oleaginous seed materials, such as soybeans, cotton seeds, peanuts and the like have been treated with aqueous solutions of low molecular weight alkanols heretofore, for the extraction of carbohydrates, (vide U.S. Pat. No. 3,966,982, Becker et al June 29, 1976; U.S. Pat. No. 3,307,944, O'Hara et al and U.S. Pat. No. 3,365,440, Cerole et al) while inhibiting the solubility of proteins in the extraction solvent. It is also known to treat defatted soybean flakes with an acidic solution to dissolve primarily the non-proteinaceous matter including ash, flavouring, saponins, sucrose, raffinose and stachyose (vide U.S. Pat. No. 3,881,076 to Sair). While these processes are effective in producing protein concentrates from relatively uncontaminated oleaginous seed materials such as soybean flakes it has not heretofore been possible to treat thioglucoside-containing and phenolic rich oil seed meals to produce a high quality edible protein product. The hot water treatment for deactivating the myrosinase prior to hexane extraction, referred to above, is not entirely satisfactory for the reasons given and no alternative process has heretofore been suggested for the production of both high quality oil and high quality meal. The problem is that rapeseed and similar oilseeds contain numerous phenolic compounds which are readily oxidized and polymerized to condensed tannins which yield dark brown-black pigments. These can cause an unattractive coloration and undesirable flavour in the food into which they are incorporated and, further, these phenolic compounds can be strongly bound to the protein and thereby diminish the nutritive value of the product. One of the most prominent phenolic compounds present in rapeseed in sinapine which, with other phenolic compounds, contributes to an astringent taste in food. The oxidation of phenolic compounds is readily achieved in neutral and alkaline conditions.

The glucosinolates contained in rapeseed are, as is well known, hydrolysed by myrosinase under the appropriate conditions to isothiocyanates, nitriles and oxazolidinethiones some of which are known to cause goitre. Rapeseed also contains a yellow pigment, the colour intensity of which is very much enhanced in alkaline environments, and such coloration is highly undesirable in many food products.

Thus, by one object of this invention, it is essential, for food use, to remove the glucosinolates and those other factors that can cause unattractive flavour and coloration and decreased nutritive value of foods while at the same time to enhance the protein content of the product, from the dehulled, defatted rapeseed meal resulting from the treatment described herein.

By one aspect of this invention there is provided a process for the production of a protein concentrate from a dehulled, defatted oleaginous thioglucoside and phenolic-containing seed material comprising the steps of (a) contacting said seed material with an aqueous-lower alkanol solvent solution under substantially non-oxidizing conditions to thereby selectively extract glucosinolates, phenolic compounds, and pigments therefrom while preventing oxidation of said phenolic compound and inhibiting enzymic degradation of glucosinolates (b) separating the liquid extract phase from a solid residue, and (c) drying the solid residue at a temperature below about 60° C. to thereby recover said protein concentrate.

By another aspect of this invention there is provided a detoxified protein concentrate, prepared from a thioglucoside and phenolic-containing oilseed, containing at least 65% protein, 0.1–0.3% fat and not more than 5.5% crude fibre, characterized by bland flavour, off-white colour, a nitrogen solubility index of at least 35%, and a P.E.R. at least as high as that of casein.

The invention will be described in more detail hereinafter with reference to the drawings in which.

Figure 1:
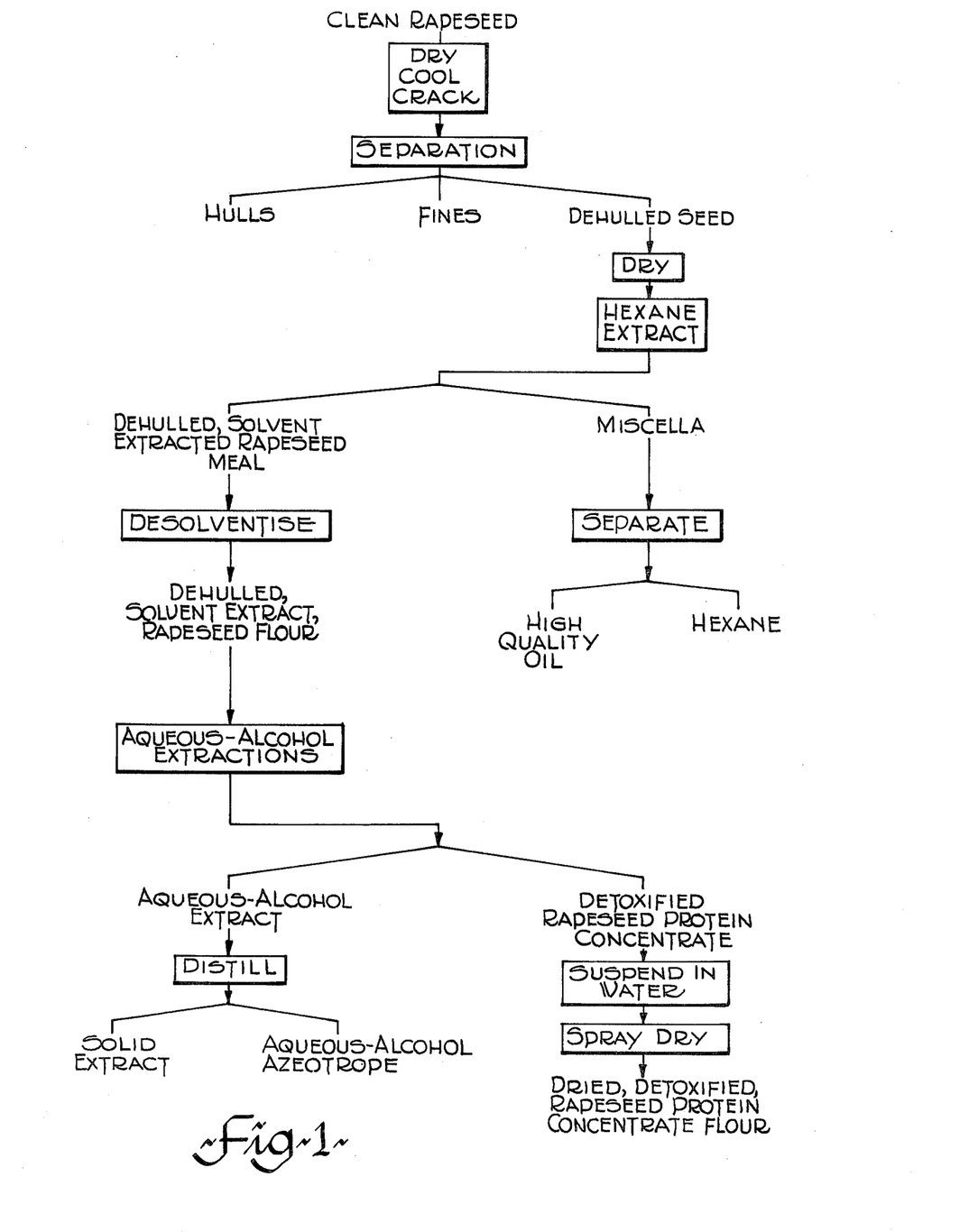
FIG. 1 is a flow sheet illustrating a preferred process for preparing a high quality oil and high quality protein concentrate from a thioglucoside-containing oilseed such as rapeseed.
Figure 2:
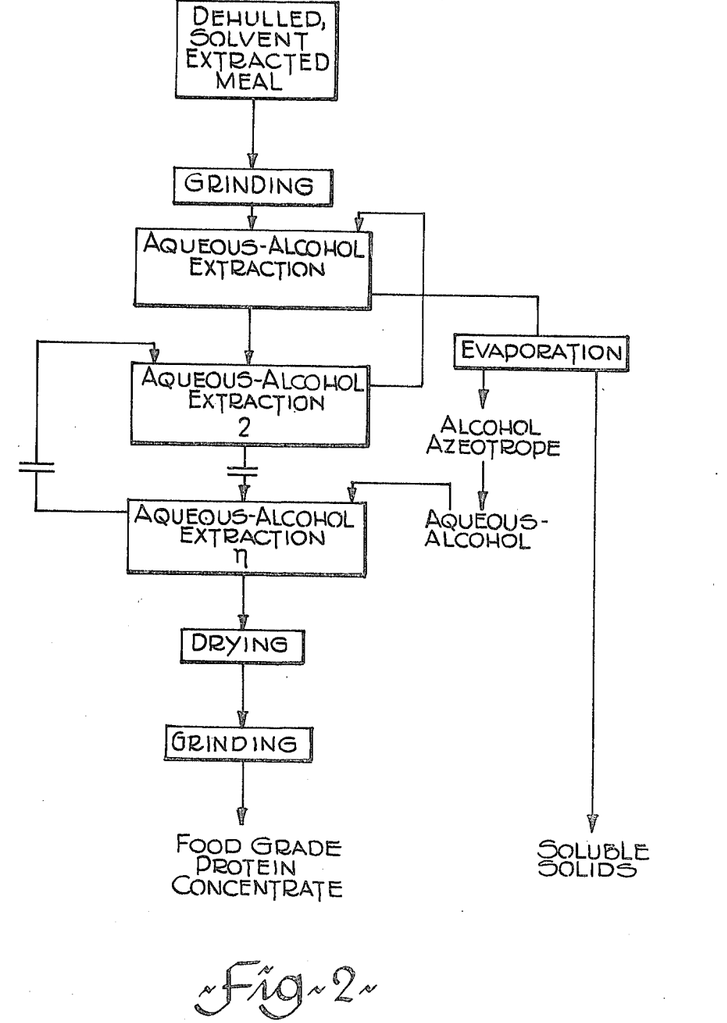
FIG. 2 is a flow sheet illustrating a preferred process according to the present invention.

Turning firstly to FIG. 1, there is shown, in schematic form, a process for producing a protein concentrate and high quality oil from an oilseed such as rapeseed. Clean rapeseed is dried in a fluid bed drier for about 15 minutes at a temperature in the range 70° C.–100° C. (seed temperature not more than 70° C.) to reduce the moisture content in the hull to 1–2%, the dried seeds are then cooled, and cracked in a dehuller such as a Buhler-Miag ® dehuller. The cracked (dehulled) seeds are then separated into a hull fraction, a fines fraction and a dehulled seed fraction in any convenient classifier, such as an airflotation stoner supplied by Kipp Kelly ® or Buhler-Miag ®. The dehulled seed fraction is then dried in a fluid bed drier at a temperature below about 70° C. to a moisture content of less than 1–3%, and solvent extracted with any suitable solvent such as hexane. The miscella is processed to recover the hexane, which is recycled, and produce a high quality crude oil which is suitable for further purification and processing. The dehulled, solvent extracted rapeseed meal is desolventised and then ground to a fine flour, generally below 50 mesh (Tyler), with as little heat generation as possible, in a suitable mill, such as a pin mill. The rapeseed flour thus produced is a preferred but not the essential starting material for the processes of the present invention. As shown in FIGS. 1 and 2, the rapeseed flour is subjected to a plurality of aqueous-alcohol extractions, under selected conditions, to remove glucosinolates, phenolics and pigments. It is, of course, known that myrosinase and other enzymes will react with glucosinolates in the presence of water to form toxic degradation products and that the phenolics are readily oxidized to condensed tannins in the presence of water. Surprisingly, however, even though there is a considerable volume of water present in the aqueous-alcohol solvent, the alcohol present appears to exhibit the enzymes present and enzymic degradation of the glucosinolates is prevented, and further, oxidation of the phenolics is prevented. We have found that solvent to solids ratios in the order of 4–10:1 V/W are particularly suitable and, in order to further prevent activation of the contained myrosinase, the temperature of the solids should not exceed 60° C. (140° F.) during extraction. The alcohol which may be any lower alkanol which is miscible with water such as methanol, ethanol, propanol, iso-propanol, or the like, is in the range 50–90% and preferably 60–75% by volume of the water-alcohol mixture. When significant amounts of chlorophyll are present in the seed we have found it advantageous to effect a prior extraction using the selected alcohol alone. As noted hereinabove the phenolics in the rapeseed flour are easily oxidized in alkaline and neutral solutions in the presence of oxygen and it is therefore essential that the extractions should be conducted in a non-oxidizing medium. It is preferable that the solution contain an antioxidant, such as sulphur dioxide, an alkaline metal metabisulphite, or ascorbic acid. A concentration of 200–600 ppm $SO_2$ in the solution by weight has been found to be particularly effective as an antioxidant. The aqueous alcohol extract is normally distilled to produce an aqueous-alcohol azeotrope and a water soluble solid extract containing substantially all the phenolics and other previously described undesirable components. As shown in FIGS. 1 and 2 the detoxified rapeseed protein concentrate may be suspended in water and then dried and ground or spray dried to produce a food grade protein concentrate flour.

EXAMPLE 1

Clean Target variety rapeseed, a high glucosinolate containing variety, free of weeds and plant fragments and equal to Canada No. 1 grade was pre-dried in a Calmic Fluid Bed Dryer at an air inlet temperature of 100° C. for a period not exceeding 15 minutes and such that the seed temperature did not exceed 65° C. and the seed moisture content was reduced to below 6%, so as to facilitate hull removal in the subsequent cracking step.

The seed was allowed to cool to room temperature and then coarsely cracked in an 8 inch Bauer Disc Mill fitted with splined discs with about 1/16 inch splines, and with a variable speed drive. The speed of the rotating disc and the space between the stationary and rotating disc were adjusted so that when the seed was fed into the mill at a slow pace, the seed was fragmented into coarse particles without pulverisation or build up or powdered seed on the discs and so that no seeds passed through the mill without being fragmented. A space of 0.075 inch with a speed setting of 4 was suitable for the seed lot used.

The cracked seed was separated into two fractions, dehulled seed and hulls plus fines, in an F.R.I. laboratory classifier capable of separating 10 pounds at a time. The F.R.I. classifier is described in the Canadian Institute of Food Science and Technology Journal, Volume 6, 1973, pages 298–299. By selective control of the air flow through the fluidized bed and by introducing steam into this air stream to overcome static effects on the walls of the fluid bed chamber, the hulls plus fines were carried over in the air stream into the cyclone and collected; the dehulled seed, being denser, remained in the fluid bed bucket and was recovered.

The dehulled seed was further dried in a Calmic Fluid Bed Dryer in such a way that the seed temperature did not exceed 65° C., preferably at 60° C., for a period of time so that the seed moisture content was reduced to 1–3% by weight, preferably below 2%. 100–120 Pound lots of the dehulled, dried rapeseed were extracted in a QVF extractor with hexane until the hexane passing through the seed mass and draining into the boiler was water clear and for approximately 60 hours of continuous extraction in the Soxhlet type solid-solvent extractor. The extracted, dehulled seed was drained of hexane and the remaining hexane vapour in the dehulled seed mass removed under vacuum over a period of two days. The solvent extracted dehulled seed or meal was removed from the extractor, exposed to air in shallow trays for 3 days to remove hexane vapours, and then reduced to a flour in an Alpine ®, Model Z160, Pin Mill. It is an important aspect of this processing that the solvent extracted meal is desolvenated under conditions whereby the meal is not subjected to conditions which denature, and hence convert to a water insoluble form, the protein present.

The flour derived from the dehulled rapeseed, processes as described above, provided the substrate for further processing into a protein cencentrate.

150g. of the flour derived from dehulled, hexane extracted Target rapeseed, as described above, was extracted with 860 ml of 70% v/v isopropanol-water (70% isopropanol, 30% water) containing 300 ppm sulphur dioxide as potassium metabisulphite. The solids were mixed with the extraction solvent in a one liter polypropylene centrifuge bottle with th aid of a Polytron ® Model PT35 Homogeniser. Mixing was achieved over a period of 15 minutes, the centrifuge bottle was closed with a screw cap and centrifuged at 2500 rpm in an International Centrifuge for 20 minutes. The liquid and solid separated into clearly identified phases and the liquid was readily decanted into a measuring cylinder without disturbing the solid layer or contaminating the decanted liquor with suspended, powdered solids.

Fresh extraction solvent, containing potassium metabisulphite, sufficient to give 300 ppm $SO_2$ was added to the wet solids in a volume sufficient to make up the original volume, such added volume thus being equal to that decanted off after centrifugation. The whole was then homogenized as before and again centrifuged and separated. Further solvent was added as before so that the flour was extracted up to six times. Thus, by taking a series of 150g lots of dehulled, solvent extracted flour and applying solvent extraction under the conditions prescribed and at room temperature (20° C.), it was possible to prepare a series of extracted samples that had been sequentially extracted with solvent up to six times. Each extracted solid was dehydrated by a final treatment with 100% isopropanol and separation by centrifugation. This aided the dewatering and drying of the solids. Finally, the solid residue was dried in a PRL Laboratory Fluid Bed Dryer fitted with an air temperature control, and at an air temperature not exceeding 50° C. The resulting free-flowing flour was passed through a Retsch Pin Mill and used for analyses. Thus a series of flour samples without treatment and up to six times extracted gave a series of compositional characteristics tabulated in Table I.

TABLE I

The Effect of the Number of Solvent Extractions of Dehulled, Hexane Extracted Target Rapeseed Flour on the Composition of the Resulting Non-Solubilized Product Recovered. Solvent 70% v/v Isopropanol-Water Solvent:Solid ratio 5.73:1 v/w (ml/g).

| Number of Extractions | Dry Matter Proximate Composition (%) | | | | | Glucosinolate (mg/g) | | phenolics (%) | Solids Solubilized (%) | % of Nitrogen Recovered |
|---|---|---|---|---|---|---|---|---|---|---|
| | Fat | Protein N × 6.25 | Fibre | Ash | NFE | Total | OZT | | | |
| Nil | 5.7 | 49.7 | 3.5 | 7.5 | 33.6 | 13.5 | 11.1 | 2.6 | 0 | 100 |
| 1 | 0.7 | 62.0 | 4.5 | 9.3 | 23.5 | 2.8 | <0.1 | 1.3 | 19 | 99.9 |

TABLE I-continued
The Effect of the Number of Solvent Extractions of Dehulled, Hexane Extracted Target Rapeseed Flour on the Composition of the Resulting Non-Solubilized Product Recovered. Solvent 70% v/v Isopropanol-Water Solvent:Solid ratio 5.73:1 v/w (ml/g).

| Number of Extractions | Dry Matter Proximate Composition (%) | | | | | Glucosinolate (mg/g) | | phenolics (%) | Solids Solubilized (%) | % of Nitrogen Recovered |
|---|---|---|---|---|---|---|---|---|---|---|
| | Fat | Protein N × 6.25 | Fibre | Ash | NFE | Total | OZT | | | |
| 2 | 0.6 | 65.6 | 5.4 | 9.9 | 18.5 | 1.8 | <0.1 | 0.6 | 28 | 96.3 |
| 3 | 0.5 | 67.1 | 5.3 | 9.6 | 17.5 | 0.5 | <0.1 | 0.2 | 31 | 94.9 |
| 4 | 0.9 | 68.4 | 5.5 | 10.2 | 15.0 | <0.1 | <0.1 | 0.1 | 31 | 94.0 |
| 5 | 0.2 | 68.0 | 5.1 | 9.7 | 17.0 | <0.1 | <0.1 | — | 33 | 90.6 |
| 6 | 0.3 | 68.9 | 5.1 | 9.8 | 15.9 | <0.1 | <0.1 | — | 35 | 91.9 |

NFE - Nitrogen Free Extract
OZT - Oxazolidinethione (Goitrin)
Phenolics measured as Sinapine Thiocyanate.

The increasing protein content in the recovered product with increase in number of solvent extractions executed is clearly indicated. This is accompanied by a small, but real, increase in fibre and ash content of the product, a marked decrease in nitrogen free extract, a marked decrease in glucosinolate content both as total glucosinolate measured as thioureas by the method of Wetter and Youngs in Journal of the American Oil Chemists Society, Volume 53, 1976, pages 162–164, and as Oxazolidinethione (Goitrin) measured by Youngs and Wetter's method published in the Journal of American Oil Chemists Society Volume 44, 1967, pages 551–554, a marked decrease in phenolics content as measured by extraction of the flour product with 70% v/v isopropanol-water and estimation of the sinapine in the liquid extract by absorption measurement in a spectrophotometer at 340 nm and comparison with crystalline sinapine thiocyanate, a solids increase appearing in the extraction solvent and a decreasing nitrogen recovery, all with increasing number of solvent extraction steps. It is evident that after 4–5 extractions, the glucosinolate and phenolics content of the resulting product are reduced to 1% or less of that in the original flour and accompanied by a selective removal by solubilization of glucosinolate, phenolics and non-nitrogenous components equal to about one third of the unextracted flour whilst at the same time removing a minimal amount of nitrogenous (protein) material as revealed by a recovery of 90% or better of the nitrogen present in the original unextracted flour in the extracted protein concentrate.

EXAMPLE 2

The same dehulled, hexane extracted flour as used in Example 1 was subjected to five consecutive extractions and isopropanol-water mixtures containing 300 ppm sulphur dioxide as potassium metabisulphite, as in Example 1, except that the isopropanol content of the extraction solvent was varied from 60% v/v to 100% v/v. Lots of 200g of flour were extracted with 800 ml aliquots of solvent (4:1 v/w), otherwise the procedure was the same as in Example 1. Five consecutive extractions with the solvent mixture were made. The effects of the isopropanol content of the extraction solvent on the product composition are shown in Table II.

TABLE II
The Effect of the Concentration of Isopropanol in the Extracting Solvent on the Resulting Insoluble Solid Recovered from Dehulled, Hexane Extracted Target Rapeseed Flour Flour Extracted 5 Times with Solvent Mixture, Followed by 2 Washing with 100% Isopropanol to Aid Water Removal Solvent:Solid Ratio 4:1 v/w (ml/g).

| Extraction solvent Composition % v/v IPA-Water | Dry Matter Proximate Composition (%) | | | | | Glucosinolate (mg/g) | | Phenolics (%) | Solids Solubilized (%) | Nitrogen Recovered (%) |
|---|---|---|---|---|---|---|---|---|---|---|
| | Fat | Protein N × 6.25 | Fibre | Ash | NFE | Total | OZT | | | |
| No extraction | 5.7 | 49.7 | 3.5 | 7.5 | 33.6 | 13.5 | 11.1 | 2.6 | 0 | 100 |
| 100 | 0.1 | 54.2 | 3.5 | 7.8 | 34.4 | 16.4 | 12.3 | 3.1 | 12.5 | 98.9 |
| | 0.2 | 53.6 | 3.6 | 7.5 | 35.0 | | | | | |
| 90 | 0.3 | 59.8 | 4.1 | 8.9 | 26.9 | 14.3 | 9.6 | 1.0 | 22.0 | 94.5 |
| | 0.6 | 58.9 | 4.3 | 9.4 | 26.8 | | | | | |
| 80 | 0.2 | 64.2 | 4.6 | 9.9 | 19.1 | 5.7 | 3.3 | 0.2 | 25.7 | 94.2 |
| | 0.3 | 64.2 | 4.9 | 10.1 | 20.5 | | | | | |
| 70 | 0.7 | 65.7 | 5.2 | 10.4 | 18.0 | 1.3 | <0.1 | 0.1 | 32.5 | 91.1 |
| | 0.4 | 66.4 | 4.7 | 11.0 | 17.5 | | | | | |
| 60 | 0.6 | 68.0 | 5.3 | 10.1 | 16.0 | 0.2 | <0.1 | <0.1 | 36.0 | 89.1 |
| | 0.8 | 68.2 | 5.4 | 10.2 | 15.4 | | | | | |

NFE - Nitrogen Free Extract
OZT - Oxazolidinethione (Goitrin)
Phenolics measured as Sinapine Thiocyanate.

Extraction of the flour with isopropanol alone solubilizes about 12% of the solids but does not solubilize glucosinolates or phenolics since the amounts of these in the product increases over their amounts in the original unextracted flour. 100% isopropanol is, however, quite an effective solvent for fat as the fat content is reduced from 5.7 to 0.1–0.2%. This solvent is not a particularly effective solvent for non-nitrogenous material, as the nitrogen free extract component of the product is increased marginally over that of the unextracted flour.

The introduction of water into the extraction solvent mixture results in a marked increase in the extraction of the undesirable components —glucosinolates, phenolics and nitrogen-free components— and results in an increased protein content of the product. Up to 36% solids is solubilized whilst at the same time 89% of the nitrogenous material of the unextracted flour is retained in the product. Under the conditions of extraction used, the optimum isopropanol-water was 60-70% v/v isopropanol, when more than 95% of the glucosinolates and phenolics were removed.

A solvent:solids ratio 4:1 (v/w) is the least ratio practical since the insoluble solids binds up to 250% by weight of the solvent mixture. A solvent:solid ratio greater than 4:1 (v/w) is therefore desirable.

EXAMPLE 3

25 Pounds of a dehulled, hexane extracted Tower rapeseed flour prepared as in Example 1, was extracted with 75% v/v isopropannol-water containing potassium metabisulphite and a solvent:solids ratio of approximately 5:1 (v/w) at ambient temperature (approximately 20° C.). Thus 25 pounds of the flour was mixed into 108 pounds of 75% v/v isopropanol-water containing 300 ppm sulphur dioxide, by passing through a Vibrio-Reactor wet colloid mill at the minimum possible head gap of the rotor. The macerate was passed through a Pfaudler ®, Model Z1L Decanter Centrifuge run under optimum conditions for the separation of the solids from the liquid. The separated solids, approximately 45 pounds, were made up with 70 pounds of extraction solvent and the extraction repeated. In all, five extractions with 75% v/v isopropanol-water were made, each extraction solvent mixture except the last extraction contained 300 ppm sulphur dioxide. Finally, the solids after the fifth extraction were mixed with 80 pounds of 100% v/v isopropanol to aid water removal in the solids and centrifuged. The final product, approximately 40 pounds containing 36% solids, was dried in a Calmic Fluid Bed Dryer at not more than 60° C. The dried product was pin milled in an Alpine ® Model Z160 Pin Mill to yield a light coloured protein concentrate product. After each step of solvent treatment, about a half pound sample of the centrifuged solids was removed, and dried in a PRL Laboratory Fluid Bed Dryer at an air input temperature of 50° C. The resulting dry samples were reduced to a flour in a Retsch Laboratory Pin Mill and analysed to provide the results as set forth in Table III.

TABLE III

Effect of Sequential Extraction of 25 lbs. Dehulled, Hexane Extracted Tower Rapeseed Flour With 75% v/v Isopropanol-Water, Solvent:Solid Ratio 5:1 v/w (ml/g) on the Composition of the Resulting Protein Concentrate Product, Temperature 20° C.

| | Dry Matter Proximate Composition (%) | | | | | Glucosinolate (mg/g) | | Phenolics |
|---|---|---|---|---|---|---|---|---|
| | Fat | Protein N.×6.25 | Fibre | Ash | Fibre | Total | OZT | w/w % |
| No Extraction | | | | | | | | |
| After 1st Extraction | 5.2 | 50.5 | 4.4 | 8.4 | 31.5 | 0.24 | <0.1 | 3.9 |
| After 2nd Extraction | 3.5 | 57.7 | 4.0 | 9.2 | 25.6 | — | — | 2.0 |
| After 3rd Extraction | 2.0 | 60.8 | 5.2 | 10.1 | 21.9 | 0.20 | <0.1 | 0.7 |
| After 4th Extraction | 2.6 | 62.6 | 5.3 | 10.1 | 18.4 | 0.18 | <0.1 | 0.2 |
| After 5th Extraction | 1.6 | 63.2 | 5.2 | 10.2 | 19.8 | 0.11 | <0.1 | 0.1 |
| After 5th Extraction followed by one extraction with 100% v/v IPA | 2.2 | 63.5 | 5.3 | 10.1 | 18.9 | <0.1 | <0.1 | <0.1 |
| | 0.9 | 66.7 | 5.4 | 10.5 | 16.5 | <0.1 | <0.1 | <0.1 |

NFE - Nitrogen Free Extract
OZT - Oxazolidinethione
Phenolics measured as Sinapine Thiocyanate The process effectively removed the glucosinolates and phenolics and at the same time increased the protein content of the product.

In a similar manner, a 100 pound sample, of dehulled solvent extracted Tower flour was extracted five times with 75% v/v - isopropanol-water at varying temperatures up to 50° C. and yielded similar results, as shown in Table IV.

TABLE IV

Effect of Sequential Extractin of 100 Lbs. Dehulled Hexane Extracted Tower Rapeseed Flour With 75% v/v Isopropanol-Water, Solvent:Solid Ratio 5:1 v/w (ml/g) On the Composition of the Resulting Protein Concentrate Product, Temperature up to 50° C.

| | Dry Matter Proximate Composition (%) | | | | | Glucosinolate (mg/g) | | Phenolics |
|---|---|---|---|---|---|---|---|---|
| | Fat | Protein N× 6.25 | Fibre | Ash | NFE | Total | OZT | w/w % |
| No extraction | 5.2 | 50.5 | 4.4 | 8.4 | 31.5 | 0.25 | <0.1 | 3.9 |
| After 1st Extraction | 2.4 | 57.0 | 4.6 | 9.4 | 26.6 | 0.12 | <0.1 | 1.8 |
| After 2nd Extraction | 2.5 | 61.1 | 4.7 | 9.9 | 21.8 | 0.12 | <0.1 | 1.0 |
| After 3rd Extraction | 2.1 | 63.7 | 5.2 | 10.1 | 18.9 | <0.1 | <0.1 | 0.2 |
| After 4th Extraction | 1.9 | 62.5 | 5.1 | 10.1 | 20.4 | <0.1 | <0.1 | — |
| After 5th Extraction | 1.8 | 64.2 | 5.6 | 10.2 | 18.2 | <0.1 | <0.1 | <0.1 |
| Further Extraction with 100% IPA | 1.0 | 66.3 | 5.2 | 10.5 | 17.0 | <0.1 | <0.1 | <0.1 |

EXAMPLE 4

A number of dehulled, hexane extracted flours, derived from Yellow Sarson rapeseed, Tower rapeseed, Target rapeseed and Yellow Mustard, were extracted five times with 70% v/v isopropanol-water in the manner as described in Examples 1 and 2, and the products analysed. The compostions are tabulated in Table V.

TABLE V

Composition of Rapeseed Protein Concentrates Prepared by 70% v/v Isopropanol-water Extractions. (Five Extractions)

| Rapeseed | Dry Matter Proximate Composition (%) | | | | | % Nitrogen Recovered |
|---|---|---|---|---|---|---|
| | Fat | Protein N × 6.25 | Fibre | Ash | NFE | |
| Yellow Sarson (B. campestris) | 0.2 | 69.5 | 5.5 | 7.8 | 17.0 | — |
| Tower (B. napus) | 0.9 | 66.7 | 5.4 | 10.5 | 16.5 | — |
| Tower (B. napus) | 1.0 | 66.3 | 5.2 | 10.5 | 17.0 | 92.7 |
| Target (B. napus) | 0.3 | 68.3 | 5.5 | 9.6 | 16.3 | 88.0 |
| Target (B. napus) | 0.5 | 68.4 | 5.3 | 9.9 | 15.9 | 92.5 |
| Yellow Mustard (B. hirta) | 0.6 | 67.2 | 5.4 | 10.5 | 16.3 | 86.2 |
| Yellow Mustard (B. hirta) | 1.1 | 69.0 | 5.1 | 10.1 | 14.7 | 84.3 |

NFE - Nitrogen Free Extract
Protein concentrates containing 66–69.5% protein were obtained, with crude fibre contents up to 5.5%. Nitrogen recovered in the protein concentrate represented about 90% of the nitrogen in the unextracted flour, though this yield was somewhat less with Yellow Mustard.

Protein concentrates prepared from Yellow Sarson Rapeseed and Yellow Mustard were subjected to Nitrogen Solubility Tests according to the Nitrogen Solubility Index Method of the official Methods of the American Oil Chemists Society (3rd edition, revised 1976). The results are presented in Table VI.

TABLE VI

| Protein Concentrate Composition | Nitrogen Solubility of Protein Concentrate | |
|---|---|---|
| | Yellow Sarson | Yellow Mustard |
| Fat | 0.2 | 1.1 |
| Protein | 69.5 | 69.0 |
| Fibre | 5.5 | 5.1 |
| Ash | 7.8 | 10.1 |
| NFE | 17.1 | 14.7 |
| Nitrogen Solubility (%) | | |
| In Water | 43 | 31 |
| pH 6.6 | 45 | 33 |
| pH 10.3 | 63 | 50 |

The concentrates showed a nitrogen solubility in water, without pH adjustment, of 43 and 31% respectively. These increased to 63 and 50% respectively when the pH was adjusted to 10.3. Thus, these concentrates retain an appreciable proportion of their solubility characteristics.

EXAMPLE 5

200g of dehulled, hexane extracted Target rapeseed flour was extracted with 70% v/v isopropanol-water in the manner described in Example 1. Seven extractions with solvent were made a solvent:solid ratio of 4:1 (v/w). A similar 200g sample of flour was extracted in similar manner but without the presence of sulphur dioxide as potassium metabisulphite in the extraction solvent. The protein concentrates prepared were analyzed and had the characteristics tabulated in Table VII.

TABLE VII

Effect of Metabisulphite in Extraction Solvent
300 ppm $SO_2$ as Potassium Metabisulphite
70% v/v IPA Extracted, Seven Extractions

| | $+SO_2$ | $-SO_2$ |
|---|---|---|
| Colour | Almost White | Pale Brown |
| Taste | Bland | Slightly bitter |
| Colour of dispersion of protein concentrate in 10% Sodium Carbonate Solution | Almost White | Brown coloured |

The presence of sulphur dioxide in the extraction solvent had a marked effect on the colour of the solvent during extraction, its absence causing the solvent to become intensely dark brown and leading to the protein conncentrate product acquiring some of the solvent colour, thus yielding a coloured product. The presence of sulphur dioxide prevented the extraction solvent becoming discoloured and yielded a protein concentrate product of very light, almost white colour and with a bland taste.

EXAMPLE 6

The rapeseed protein concentrate prepared as in Example 3 and cited in Table IV was subjected to nutritional evaluation in the Protein Efficiency Ratio Test (P.E.R. Test) conducted according to "Official Methods of Analysis" of the Association of Official Analytical Chemists p. 800, 11th Edition 1970 published by Association of Official Analytical Chemists P.O. Box 540, Benjamin Franklin St., Washington, D.C. The amino acid composition was also determined and the results for the essential amino acids given in Table VIII.

TABLE VIII

Nutritional Evaluation by Rat Feeding Experiments and Essential Amino Acid Composition (g/16g N)

| | Rapeseed Protein Concentrate | Soy Protein* Concentrate | FAO/WHO Reference (1973) |
|---|---|---|---|
| PER (PER casein - 2.5) | 2.5 | 1.7 | |
| Protein | 66.3% | 71.0% | |
| Essential Amino Acids: | | | |
| Isoleucine | 4.4 | 4.9 | 4.0 |
| Leucine | 8.5 | 8.0 | 7.0 |
| Lysine | 6.7 | 6.6 | 5.5 |
| Methionine | 2.1 | 1.3 | 3.5 |
| Cystine | 2.9 | 1.6 | — |
| Met. + Cys. | 5.0 | 2.9 | — |
| Phenylalanine | 4.6 | 5.3 | 6.0 |
| Tyrosine | 3.6 | 3.7 | — |
| Phe. + Tyr. | 8.2 | 9.1 | — |
| Threonine | 5.7 | 4.3 | 4.0 |
| Tryptophane | 1.2 | 1.4 | 1.0 |

TABLE VIII-continued

Nutritional Evaluation by Rat Feeding Experiments
and Essential Amino Acid Composition (g/16g N)

|  | Rapeseed Protein Concentrate | Soy Protein* Concentrate | FAO/WHO Reference (1973) |
|---|---|---|---|
| Valine | 5.9 | 5.0 | 5.0 |

*From Table 7.4 and 7.6, Chapter 7 by Liener in "Soyabeans: Chemistry and Technology", Vol. 1 by A. K. Smith and S. J. Circle, AVI Publishing Company Inc., 1972.

The PER of Rapeseed Protein Concentrate is superior to that of Soy Protein Concentrate and is supported by the superior essential Amino Acid Composition of Rapeseed Protein Concentrate, particularly of the sulphur amino acids, methionine and cystine. It also meets the composition of the FAO/WHO Reference of essential amino acid composition, proposed in 1973, as the minimum desirable composition for a protein for human consumption, except for its phenylalanine content, though this is generally combined with tyrosine for essential amino acid purposes.

The same Rapeseed Protein Concentrate was fed as a sole protein in the diet of rats at dietary protein levels of 5, 10 and 20% over a four week period and compared with control animals fed dietary casein. At the termination of feeding, the test animals were killed and the thyroid, kidneys and livers were compared to observe any organ enlargement as a consequence of the dietary protein supplied. The thyroid is the target organ which shows marked enlargement if goitrogenic substances are present, e.g. isothiocyanates and goitrin originating from glucosinolates.

TABLE IX

Organ Weights of Rats Fed Rapeseed Protein Concentrate Compared with Casein

|  | Diet % Protein | Thyroid Weight mg/100g | Kidney Weight g/100g | Liver Weight g/100g |
|---|---|---|---|---|
| Casein (Control) | 5 | 6.73 ± 0.59 | 0.83 ± 0.02 | 4.51 ± 0.12 |
|  | 10 | 6.66 ± 0.35 | 0.65 ± 0.01 | 4.44 ± 0.09 |
|  | 20 | 6.45 ± 0.36 | 0.77 ± 0.01 | 4.49 ± 0.09 |
| Rapeseed Protein Concentrate | 5 | 7.35 ± 0.39 | 0.77 ± 0.02 | 4.37 ± 0.13 |
|  | 10 | 6.86 ± 0.29 | 0.71 ± 0.02 | 4.52 ± 0.12 |
|  | 20 | 6.60 ± 0.24 | 0.70 ± 0.01 | 4.62 ± 0.06 |

It is shown in the results tabulated in Table 9 that the organs of animals fed Rapeseed Protein Concentrate are not significantly different in weight from those of control animals. No evidence of enlarged thyroids was detected, neither did the test animals show any other toxic effects arising from the process used to prepare the Protein Concentrate.

It is evident that the process herein described effectively removes glucosinolates and phenolics from dehulled, defatted rapeseed to yield a non-toxic, light coloured, bland protein concentrate containing 65–69% protein of a high nutritive value and containing not more than 5.5% crude fibre and in which the protein is not denatured as shown by a nitrogen solubility index of at least 30%.

We claim:

1. A process for the production of a protein concentrate for a dehulled, defatted oleaginous thioglucoside and phenolic containing seed material, in which the protein has not been subjected to denaturing conditions, comprising the steps of:
   (a) contacting said seed material with an aqueous-lower alkanol solvent solution to thereby selectively extract glucosinolates, phenolic compounds and pigments therefrom at a temperature below 60° C. and under conditions so as to prevent oxidation of said phenolic compounds and inhibiting enzymic degradation of glucosinolates;
   (b) separating the liquid extract phase from a solid residue; and
   (c) drying the solid residue at a temperature below about 60° C. to thereby recover said protein concentrate.

2. A process as claimed in claim 1, wherein step (a) is conducted in the presence of an antioxidant.

3. A process as claimed in claim 2 wherein said antioxidant is selected from the group comprising sulphur dioxide, an alkali metal metabisulphite and ascorbic acid.

4. A process as claimed in claim 3, wherein said sulphur dioxide is present in an amount in the range about 200–600 ppm based on said solution.

5. A process as claimed in claim 1, wherein the temperature of said seed material in said solvent extraction step is in the range 20°–50° C.

6. A process as claimed in claim 1, wherein said lower alkanol is selected from the group consisting of methanol, ethanol, propanol and isopropanol.

7. A process as claimed in claim 1, wherein said dehulled, defatted seed material is obtained by dehulling, drying below about 70° C. to a moisture content in the range 1–3% and subjecting to solvent extraction to remove oil.

8. A process as claimed in claim 7 including the step of predrying seed material to a moisture content below 6% prior to dehulling.

9. A detoxified protein concentrate, prepared from a thioglucoside and phenolic-containing oilseed, containing about 65% to 70% protein, 0.1–0.3% fat and not more than 5.5% crude fibre, characterized by bland flavour. off-white colour, a nitrogen solubility index of at least 30%, a Nitrogen Free Extract in the range about 14.7 to 17.1 and a P.E.R. at least as high as that of casein.

10. A concentrate as claimed in claim 9 wherein said oilseed is rape seed.

11. A concentrate as claimed in claim 10 wherein the protein content of said rapeseed concentrate has the essential amino acid composition (in g/16 g N): isoleucine 4.4, leucine 8.5, lysine 6.7, methionine and cystine 5.0, phenylalamine and tyrosine 8.2, threonine 5.7, tryptophane 1.2 and valine 5.9.

* * * * *

UNITED STATES PATENT AND TRADEMARK OFFICE
CERTIFICATE OF CORRECTION

PATENT NO. : 4,158,656

DATED : June 19, 1979

INVENTOR(S) : John D. Jones and John Holme

It is certified that error appears in the above-identified patent and that said Letters Patent are hereby corrected as shown below:

Column 1, line 66 "soybeam" should read --soybean--;

Column 2, line 13 "of" should read --or--;
Column 2, line 24, "cann" should read --can--;
Column 2, line 44 "remains" should read --retains--;

Column 3, line 34 "in" (Second Occurrence) should read --is--;

Column 10, line 43, title of Table IV "Extractin" should read --Extraction--;

Column 11, lines 22-25, the passage "Protein concentrates ... Yellow Mustard" should be in large type indicating part of the test and not part of Table V;

Column 12, line 8 "made a" should read --made at a--;

Column 13, line 45 "Table 9" should read --Table IX--;
Column 13, line 62 (claim 1, line 2) "for" should read --from--;

UNITED STATES PATENT AND TRADEMARK OFFICE
CERTIFICATE OF CORRECTION

PATENT NO. : 4,158,656

DATED : June 19, 1979

INVENTOR(S) : John D. Jones and John Holme

It is certified that error appears in the above-identified patent and that said Letters Patent are hereby corrected as shown below:

Columns 9 and 10, Table III should appear as follows:

TABLE III

Effect of Sequential Extraction of 25 lbs. Dehulled, Hexane Extracted Tower Rapeseed Flour With 75% v/v Isopropanol-Water, Solvent:Solid Ratio 5:1 v/w (ml/g) on the Composition of the Resulting Protein Concentrate Product, Temperature 20° C.

| | Dry Matter Proximate Composition (%) | | | | | Glucosinolate (mg/g) | | Phenolics |
|---|---|---|---|---|---|---|---|---|
| | Fat | Protein N ×6.25 | Fibre | Ash | NFE | Total | OZT | w/w % |
| No Extraction | 5.2 | 50.5 | 4.4 | 8.4 | 31.5 | 0.24 | <0.1 | 3.9 |
| After 1st Extraction | 3.5 | 57.7 | 4.0 | 9.2 | 25.6 | — | — | 2.0 |
| After 2nd Extraction | 2.0 | 60.8 | 5.2 | 10.1 | 21.9 | 0.20 | <0.1 | 0.7 |
| After 3rd Extraction | 2.6 | 62.6 | 5.3 | 10.1 | 18.4 | 0.18 | <0.1 | 0.2 |
| After 4th Extraction | 1.6 | 63.2 | 5.2 | 10.2 | 19.8 | 0.11 | <0.1 | 0.1 |
| After 5th Extraction | 2.2 | 63.5 | 5.3 | 10.1 | 18.9 | <0.1 | <0.1 | <0.1 |
| After 5th Extraction followed by one extraction with 100% v/v IPA | 0.9 | 66.7 | 5.4 | 10.5 | 16.5 | <0.1 | <0.1 | <0.1 |

NFE - Nitrogen Free Extract
OZT - Oxazolidinethione
Phenolics measured as Sinapine Thiocyanate Signed and Sealed this Twentieth Day of November 1979

[SEAL]

Attest:

RUTH C. MASON
Attesting Officer

LUTRELLE F. PARKER
Acting Commissioner of Patents and Trademarks